Figures 1, 2, 3:
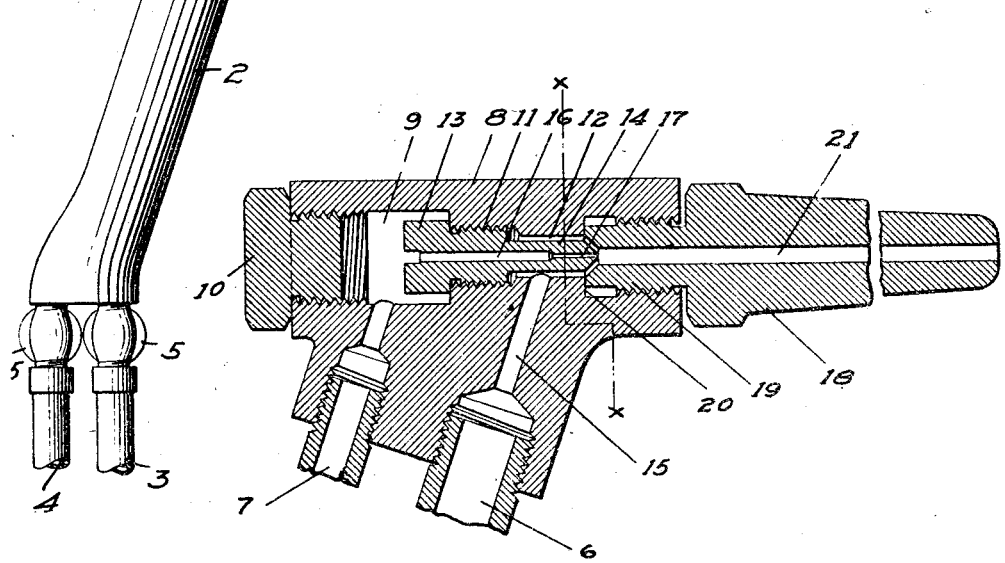

J. W. & E. H. SMITH.
ACETYLENE BLOWPIPE.
APPLICATION FILED JAN. 10, 1913.

1,136,492.

Patented Apr. 20, 1915.

WITNESSES

INVENTORS
JOHN W. SMITH
ELMER H. SMITH
BY
ATTORNEYS

UNITED STATES PATENT OFFICE.

JOHN W. SMITH AND ELMER H. SMITH, OF MINNEAPOLIS, MINNESOTA.

ACETYLENE BLOWPIPE.

1,136,492.　　　　Specification of Letters Patent.　　Patented Apr. 20, 1915.

Application filed January 10, 1913. Serial No. 741,189.

*To all whom it may concern:*

Be it known that we, JOHN W. SMITH and ELMER H. SMITH, citizens of the United States, residents of Minneapolis, Hennepin county, Minnesota, have invented certain new and useful Improvements in Acetylene-Blowpipes, of which the following is a specification.

Our invention relates to blow pipes designed for use with acetylene flames for metal cutting and welding purposes, and the object of the invention is to simplify and improve the construction of the blow pipe in general use to the end that the acetylene gas and oxygen will be more uniformly and thoroughly mixed and the flare back of the flame in the burner will be positively prevented.

The invention consists generally in various constructions and combinations, all as hereinafter described and particularly pointed out in the claim.

In the accompanying drawings forming part of this specification, Figure 1 is a side view of a blow pipe embodying our invention, Fig. 2 is a longitudinal sectional view through the burner of the blowpipe, Fig. 3 is a transverse sectional view on the line *x—x* of Fig. 2.

In the drawing, 2 represents the handle of the blow pipe and 3 and 4 acetylene gas and oxygen tubes connected therewith and provided with regulating valves 5. These tubes communicate with a suitable source of gas and oxygen under pressure, not shown. At the opposite end of the handle 2 pipes 6 and 7 are provided, which communicate through the handle with the tubes 3 and 4 and on these pipes the burner proper is mounted. 8 represents the head of the burner, into which on one side the pipes 6 and 7 are tapped. In one end of the head a chamber 9 is formed, provided with a removable plug 10 which allows access to the chamber. At the inner end of the chamber a socket is formed, consisting of an interiorly threaded outer portion 11 and a cylindrical inner portion 12 of less diameter than the outer portion. A plug 13 has a part exteriorly threaded to engage the threaded walls of the socket, and a tip 14 is formed in the inner end of the plug, which projects into the inner portion 12 and is spaced from the walls thereof, forming an annular passage around the tip. The pipe 6 communicates through a duct 15 with this passage and the pipe 7 with the chamber 9. The inner end of the tip 14 is preferably tapered and the plug has a central duct 16 formed therein, extending lengthwise thereof and terminating in a small duct or passage 17 which extends through to the end of the tip, concentric with the duct 16. A nozzle 18 has a threaded nipple 19 formed on its inner end that is adapted to screw into a socket in the head, the inner end of the nipple 19 being seated against a shoulder 20 adjacent to the inner end of the tip 14. The nozzle 18 is provided with a central duct 21 which communicates with the duct 17, and the inner portion of the nipple 19 is counter-sunk, forming beveled or diverging surfaces parallel with the tapered inner end of the tip 14 and spaced therefrom to form a narrow annular passage around the tapered end of the tip when the nozzle 18 is screwed into its seat against the shoulder 20.

In the operation of the blow pipe, the gas and oxygen will flow into the head and the oxygen will be discharged through a central orifice in the nipple into the duct 21. The acetylene gas entering the annular chamber around the nipple will flow between the tip of the nipple and the inner end of the nozzle 18 and will completely encircle the stream of oxygen flowing through the nipple, and the walls of the passage through which the acetylene is discharged will direct the gas toward the center of the duct 21, where it will contact with the oxygen and mingle with it and be thoroughly mixed before reaching the discharge end of the nozzle.

It will be noted that where the acetylene enters the annular passage around the cylindrical tip that the walls of the entrance duct direct the gas against the surface of the tip and the gas will be deflected by this surface of the tip and caused to flow around through the annular passage before entering the duct of the nozzle. The stream of oxygen will thus be encircled by the gas and the converging walls of the end of the tip and the counter-sunk portion of the nozzle will direct the gas inwardly and cause its thorough mixture with the stream of oxygen. This annular passage and the narrow passage around the tip will also present a tortuous path and eliminate to a large degree the danger of flare-back from the nozzle.

We claim as our invention:—

An acetylene blow pipe comprising a head having a chamber formed in one end thereof and a cap for said chamber, the bottom of said chamber having a socket therein, a plug fitting within said socket and accessible through said chamber and provided with a tip projecting into said socket and spaced from the walls thereof to form an annular passage, said plug having a longitudinal duct therein extending from end to end and communicating at one end with said chamber, the inner end of said tip being beveled, a nozzle fitting within the other end of said head and provided with a longitudinal duct concentric with the duct in said tip, the inner end of said nozzle being countersunk and adapted to receive the tapered end of said tip and uniformly spaced therefrom to form a flaring annular passage communicating with the passage around said tip, said head also having ducts in its side walls communicating respectively with said chamber through the side walls thereof and with said annular passage, and oxygen and acetylene gas pipes mounted in said head and communicating respectively with said ducts, the acetylene gas entering said annular passage being directed against the wall of said tip and flowing around the same before passing to the inlet of said nozzle, the walls of said flaring passage around the tapered portion of said tip directing the acetylene gas inwardly into the jet of oxygen flowing through said tip.

In witness whereof, I have hereunto set my hand this 28th day of December 1912.

JOHN W. SMITH.
ELMER H. SMITH.

Witnesses:
GENEVIEVE E. SOREN
EDWARD A. PAUL.